United States Patent
Juntti et al.

(10) Patent No.: US 7,466,779 B2
(45) Date of Patent: Dec. 16, 2008

(54) DATA TRANSMISSION METHOD, DATA TRANSMISSION ARRANGEMENT AND BASE STATION

(75) Inventors: Markku Juntti, Oulu (FI); Kimmo Kansanen, Oulu (FI)

(73) Assignee: Nokia Corporation, Espoo (FI)

( * ) Notice: Subject to any disclaimer, the term of this patent is extended or adjusted under 35 U.S.C. 154(b) by 721 days.

(21) Appl. No.: 10/606,288

(22) Filed: Jun. 26, 2003

(65) Prior Publication Data

US 2004/0076244 A1   Apr. 22, 2004

(30) Foreign Application Priority Data

Jun. 28, 2002   (FI) ................................... 20021288

(51) Int. Cl.
   *H04B 1/10* (2006.01)
(52) U.S. Cl. ...................................................... 375/350
(58) Field of Classification Search ................. 375/350, 375/346, 355, 285
   See application file for complete search history.

(56) References Cited

U.S. PATENT DOCUMENTS

| 4,998,111 | A | * | 3/1991 | Ma et al. ..................... 342/352 |
| 5,533,067 | A | * | 7/1996 | Jamal et al. ................. 375/341 |
| 5,732,044 | A | * | 3/1998 | Jarvis ......................... 367/134 |
| 6,389,295 | B1 |   | 5/2002 | Ramesh |
| 6,466,616 | B1 | * | 10/2002 | Stenstrom et al. ........... 375/233 |
| 6,934,327 | B1 | * | 8/2005 | Whited et al. ............... 375/225 |

FOREIGN PATENT DOCUMENTS

| EP | 1 276 287 A2 | 1/2003 |
| WO | WO 00/54431 | 9/2000 |

* cited by examiner

*Primary Examiner*—Kevin Y Kim
(74) *Attorney, Agent, or Firm*—Squire, Sanders & Dempsey, LLP

(57) ABSTRACT

The invention relates to a method, a prefiltering arrangement and a base station for implementing an adaptive channel estimator. The method comprises determining from a received signal at least one variable representing statistical characteristics of a channel, determining a prefilter by means of the at least one variable representing the statistical characteristics of the channel, and adapting the prefilter output sample rate for the channel estimator.

32 Claims, 2 Drawing Sheets

DATA TRANSMISSION METHOD, DATA TRANSMISSION ARRANGEMENT AND BASE STATION

BACKGROUND OF THE INVENTION

1. Field of the Invention:

A method for implementing an adaptive channel estimator, a prefiltering arrangement for implementing the adaptive channel estimator and a base station, in which an input signal of the channel estimator is adapted.

2. Description of the Related Art:

In radio receivers channel estimators are used for measuring the state of a radio channel. Typically, state information is required for implementing coherent detection, and additionally, it can be utilized in measuring a signal-to-noise ratio (SNR), a signal-to-interference ratio and in implementing various channel equalizers so as to remove phase distortion or inter-symbol interference (ISI). The inter-symbol interference results from linear and non-linear distortions caused to the signal in the radio channel. Inter-symbol interference is produced in band-limited channels, when the pulse form in use spreads to adjacent pulse time slots. The problem is considerable, especially at high transmission rates in multimedia services or in data transmission applications. There is a plurality of equalizers of different types, such as a decision feedback equalizer (DFE) or a maximum likelihood (ML) equalizer and a maximum likelihood sequence estimation (MLSE) equalizer based on the Viterbi algorithm. In practice, the channel equalizers are generally implemented by means of various filter structures.

Variations in user movement rates and movement in general make it difficult to design equalizers in cellular radio systems. Movement of a radio transmitter causes Doppler distortion, i.e. frequency shifts and changes in a radio channel, for instance, because of variations in terrain. A channel estimator determines a channel impulse response by means of measurements. The channel estimator is also typically implemented by means of filter structures.

If the radio transmitter moves slowly, the channel also changes slowly, whereby the channel coherence time is long and several successive channel measurements have high correlation. Thus, it is possible to use a long channel filter, which utilizes the interdependency of the measurements to improve the accuracy of the estimate. If the radio transmitter moves fast, the correlation of the successive measurements is lower and it decreases faster than in the case of slow movement. The channel coherence time is thus short. In general terms, it could be stated that the higher the speed of the transmitter, the shorter the channel estimate filter should be. This poses problems, because the filter length must be changed as the movement rate changes. In prior art this is solved by using a long filter and by setting a necessary number of taps to zero. In view of the resource management this solution is not efficient. In addition, in many cases the great number of taps increases quantization noise.

SUMMARY OF THE INVENTION

The object of the invention is to provide a method for implementing adaptive filtering and apparatus implementing the method. This is achieved by a method for implementing an adaptive channel estimator. The method of the invention comprises determining from a received signal at least one variable representing statistical characteristics of the channel, determining a prefilter by means of at least one variable representing the statistical characteristics of the channel, adapting sample rate of the prefilter output for a channel estimator.

The invention also relates to prefiltering arrangement for implementing an adaptive channel estimator. The prefiltering arrangement of the invention comprises means for determining from a received signal at least one variable representing statistical characteristics of the channel, means for determining the number of prefilter taps by means of at least one variable representing the statistical characteristics of the channel so as to adapt the sample rate of the prefilter output for a channel estimator.

The invention also relates to a base station, in which an input signal of the channel estimator is adapted. The base station of the invention comprises means for determining from a received signal at least one variable representing the statistical characteristics of the channel, means for determining the number of prefilter taps by means of the at least one variable representing the statistical characteristics of the channel so as to adapt the sample rate of the prefilter for a channel estimator.

The preferred embodiments are disclosed in the dependent claims.

The invention is based on the idea that a received signal is applied to a prefilter, in which the sample rate is adapted for the channel estimator. The aim of sample rate adaptation is to keep the length of the channel estimator constant, or at least to reduce the variation range of the length, despite the changing conditions.

Several advantages are achieved with the method and system of the invention: resources will be saved and the number of channel estimator taps will be minimized, if so desired, and in the most advantageous case it can be kept constant, whereby the channel estimator design will be simplified.

BRIEF DESCRIPTION OF THE DRAWINGS

In the following, the invention will be described in greater detail in connection with preferred embodiments, with reference to the attached drawings, wherein.

DESCRIPTION OF THE PREFERRED EMBODIMENTS

Figure 1:
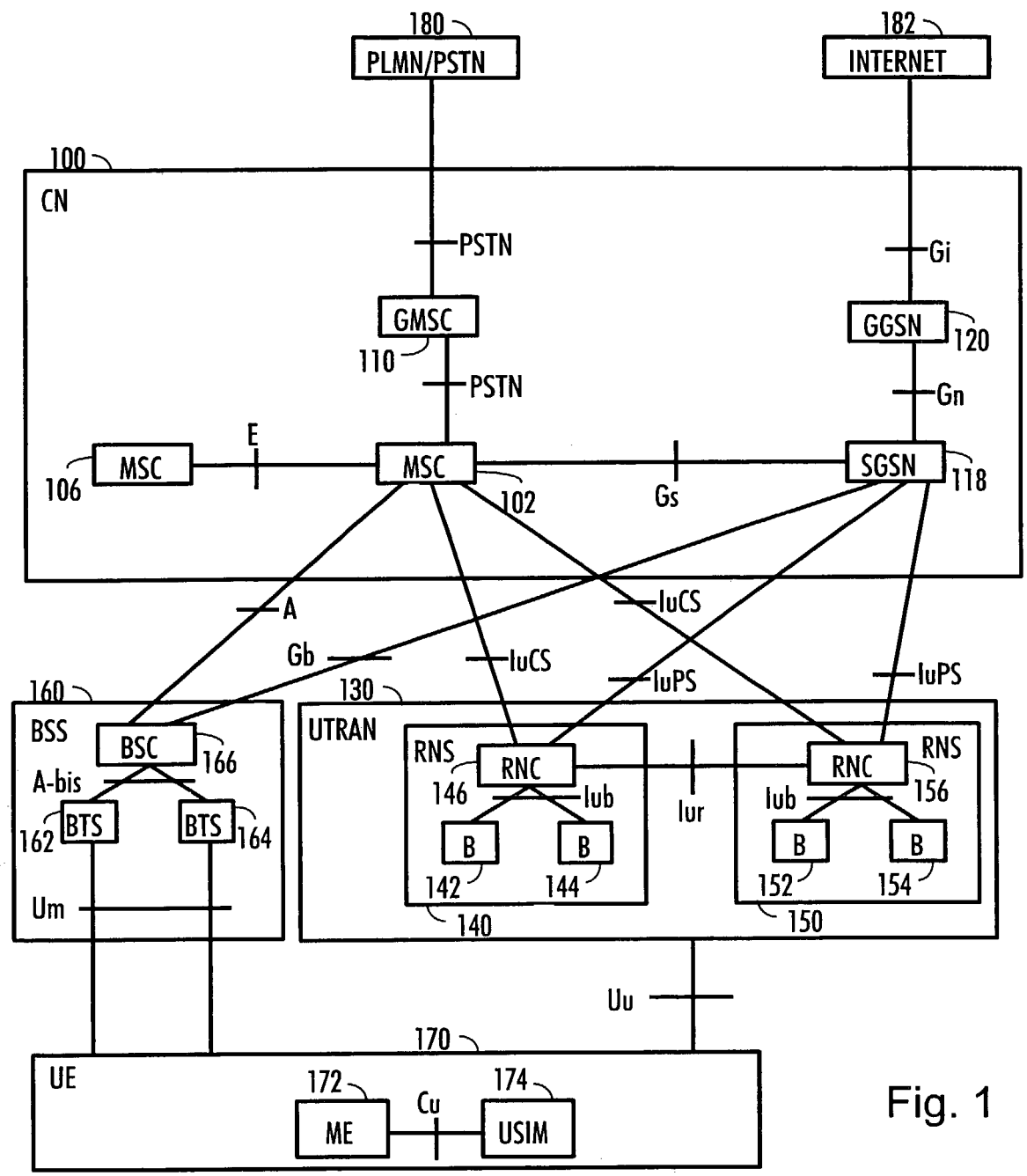
FIG. 1 shows an example of a telecommunications system.

Since the radio systems of the second and the third generations and their various hybrids, i.e. radio systems of the 2.5 generation, are in use worldwide and under constant development, in FIG. 1 the embodiments are described in a simplified radio system, which comprises network elements from different generations in parallel. In the description, the radio system of the second generation is represented by the GSM (Global System for Mobile Communications), the third generation radio system by a radio system which is based on the GSM, uses the EDGE technique (Enhanced Data Rates for Global Evolution) for increasing the data transmission rate, and can also be used for implementing packet transmission in the GPRS system (General Packet Radio System). Sometimes the EDGE system is seen as a 2.5 generation system. The third generation radio system is also represented by a radio system which is known at least by the names IMT-2000 (International Mobile Telecommunications 2000) and UMTS (Universal Mobile Telecommunications System). The embodiments are not, however, restricted to these systems given as examples but a person skilled in the art may apply the solution in other radio systems provided with the necessary properties.

FIG. 1 is a simplified block diagram, which describes the most important network elements of the radio system and the interfaces between them. The structure and function of the network elements are not described in detail because they are commonly known.

The main parts of the radio system are a core network (CN) 100, a radio access network 130 and user equipment (UE) 170. The term UTRAN is an abbreviation from UMTS Terrestrial Radio Access Network, i.e. the radio access network belongs to the third generation and is implemented by wideband code division multiple access WCDMA. FIG. 1 further illustrates a base station system 160, which belongs to the 2/2.5 generation and is implemented by time division multiple access TDMA.

Generally, the radio system can also be defined as follows: the radio system consists of a user terminal, which is also called a subscriber terminal or a mobile station, and of a network part, which includes the fixed infrastructure of the radio system, i.e. a core network, a radio access network and a base station system.

The structure of the core network 100 corresponds to a combined structure of the GSM and GPRS systems. The network elements of the GSM are responsible for implementing circuit-switched connections and the network elements of the GPRS are responsible for implementing packet-switched connections. However, some of the network elements are included in both systems.

A mobile services switching centre (MSC) 102 is the centre of the circuit-switched side of the core network 100. The same mobile services switching centre 102 can be used to serve the connections of both the radio access network 130 and the base station system 160. The tasks of the mobile services switching centre 102 typically include switching, paging, user terminal location registration, handover management, collection of subscriber billing information, data encryption parameter management, frequency allocation management and echo cancellation.

The number of mobile services switching centres 102 may vary: a small network operator may have only one mobile services switching centre 102, whereas large core networks 100 may have several ones. FIG. 1 shows another mobile services switching centre 106 but its connections to other network elements are not illustrated to keep FIG. 1 sufficiently clear. Large core networks 100 may comprise a separate gateway mobile services switching centre (GMSC) 110, which is responsible for circuit-switched connections between the core network 100 and the external networks 180. The gateway mobile services switching centre 110 is located between the mobile services switching centres 102, 106 and the external networks 180. The external network 180 may be, for example, a public land mobile network PLMN or a public switched telephone network PSTN.

The core network 100 typically comprises other parts, too, such as a home location register HLR, which includes a permanent subscriber register and, if the radio system supports the GPRS, a PDP address (PDP=Packet Data Protocol), and a visitor location register VLR, which includes information on roaming of the user terminals 170 in the area of the mobile services switching centre 102. Not all parts of the core network are shown in FIG. 1 to keep it clear.

A serving GPRS support node (SGSN) 118 is the centre of the packet-switched side of the core network 100. The main task of the serving GPRS support node 118 is to transmit and receive packets with the user terminal 170 supporting packet-switched transmission, utilizing the radio access network 130 or the base station system 160. The serving GPRS support node 118 includes subscriber information and location information on the user terminal 170.

A gateway GPRS support node (GGSN) 120 on the packet-switched side corresponds to the gateway mobile services switching centre 110 on the circuit-switched side, with the exception that the gateway GPRS support node 120 has to be able to route outgoing traffic from the core network 100 to external networks 182, whereas the gateway mobile services switching centre 110 routes only the incoming traffic. In the example, the external networks 182 are represented by the Internet, via which a considerable part of wireless telephone traffic can be transmitted in the future.

The base station system 160 consists of a base station controller (BSC) 166 and base transceiver stations (BTS) 162, 164. The base station controller 166 controls the base transceiver stations 162, 164. In principle, the devices implementing the radio path and their functions should be located in the base transceiver station 162, 164 and the management devices in the base station controller 166. The implementation may naturally deviate from this principle.

he base station controller 166 is usually responsible for the following tasks, for example: management of the radio resources of the base transceiver station 162, 164, intercell handover, frequency management, i.e. allocation of frequencies to the base transceiver stations 162, 164, management of frequency hopping sequences, measurement of time delays on the uplink, implementation of the operation and management interface, and management of power control.

The base station 162, 164 includes at least one transceiver which forms one carrier wave. In the GSM systems, one carrier wave usually comprises eight time slots, i.e. eight physical channels. One base station 162, 164 may serve one cell or several sectorized cells. The cell diameter may vary from a few metres to dozens of kilometres. The base station 162, 164 is often deemed to include a transcoder, too, for performing conversion between the speech coding format used in the radio system and the speech coding format used in the public switched telephone system. In practice the transcoder, however, is usually physically located in the mobile services switching centre 102. The base station 162, 164 is usually responsible for the following tasks, for example: calculation of a TA (timing advance), measurements on the uplink, channel coding, encryption, decryption and frequency hopping.

The radio access network 130 consists of radio network subsystems 140, 150. Each radio network subsystem 140, 150 consists of radio network controllers (RNC) 146, 156 and B nodes 142, 144, 152, 154. The B node is rather an abstract concept, which is frequently replaced by the term 'base station'. Functionality the radio network controller 140, 150 roughly corresponds to the base station controller 166 of the GSM system and the B node 142, 144, 152, 154 to the base station 162, 164 of the GSM system. Solutions are also available where the same device serves both as the base station and as the B node, i.e. the device can simultaneously implement the TDMA and the WCDMA radio interface.

The user terminal 170 consists of two parts: mobile equipment (ME) 172 and a UMTS subscriber identity module (USIM) 174. In the GSM system the identity module of the system is naturally used. The user terminal 170 comprises at least one transceiver for establishing a radio connection to the radio access network 130 or to the base station system 160. The user terminal 170 may include at least two different subscriber identity modules. In addition, the user terminal 170 comprises an antenna, a user interface and a battery. Nowadays various kinds of user terminals 170 are available, e.g. vehicle-mounted and portable terminals. The user terminals 170 also have properties similar to those of a personal computer or a portable computer.

The USIM 174 includes information on the user and information on data security, e.g. an encryption algorithm, in particular. In the following, the interfaces between different network elements shown in FIG. 1 are presented in Table 1. It is obvious to a person skilled in the art that the interfaces included in the radio telecommunications system are determined by the hardware implementation and the standard used, for which reason the interfaces of the system may differ from those shown in FIG. 1. In the UMTS, the most important interfaces are the Iu interface between the core network and the radio access network, which is divided into the IuCS (CS=Circuit Switched) interface of the circuit-switched side and the IuPS (PS=Packet Switched) interface of the packet-switched side, and the Uu interface between the radio access network and the user terminal. In the GSM, the most important interfaces are the A interface between the base station controller and the mobile services switching centre, the Gb interface between the base station controller and the serving GPRS support node, and the Um interface between the base station and the user terminal. The interface defines what kind of messages different network elements may use to communicate with one another. The object of the standardisation of interfaces is to enable function between network elements of different manufacturers. In practice, however, some of the interfaces are manufacturer-specific.

TABLE 1

| Interface | Network elements |
|---|---|
| Uu | UE-UTRAN |
| Iu | UTRAN-CN |
| IuCS | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| E | MSC-MSC |
| Gs | MSC-SGSN |
| PSTN | MSC-GMSC |
| PSTN | GMSC-PLMN/PSTN |
| Gn | SGSN-GGSN |
| Gi | GGSN-INTERNET |

Figure 2:
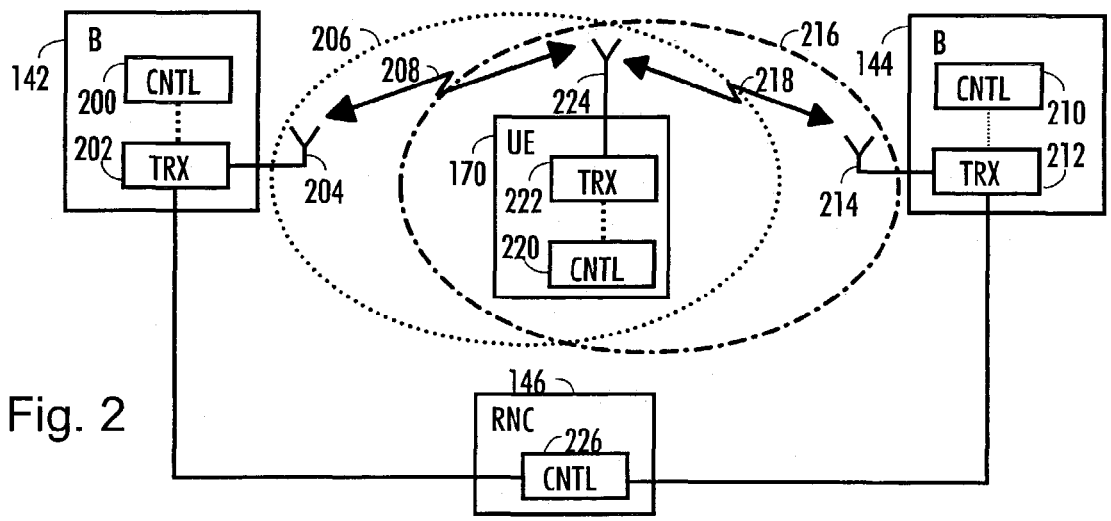
FIG. 2 shows a second example of a telecommunications system.

In the following, a cellular WCDMA radio telecommunications system will be described by means of FIG. 2. FIG. 2 shows part of a simplified radio system, which comprises a subscriber terminal 170, two base stations 142, 144 and a base station controller 146. The first base station 142 comprises a transceiver 202, an antenna 204 and a control block 200. Likewise, the second base station 144 comprises a transceiver 212, an antenna 214 and a control block 210. The base station controller 146 also comprises a control block 226. The user terminal 170 also comprises a normal transceiver 222 and an antenna for implementing a radio connection and a control block 220.

The transceivers 202, 212, 222 use the CDMA technology (Code Division Multiple Access). In the CDMA technology, i.e. in code division multiple use, radio resources are allocated to each user by means of user-specific codes. The technique is generally known, for which reason it will not be described in greater detail here. The antennas 204, 214, 224 can be implemented by common prior art solutions, e.g. as omnidirectional antennas or as antennas employing a directed antenna beam. In the radio telecommunications system, the radio cells created by base stations usually overlap to some extent to provide extensive coverage. This is illustrated in FIG. 2 by a radio cell 206 created by the base station 142 and a radio cell 216 created by the base station 144. In the existing radio telecommunications systems, wireless telecommunications connections are established by user terminals and base stations which communicate with one another on a radio connection, i.e. calls or data transmission connections between different user terminals are established via base stations. This is illustrated in FIG. 2 by radio connections 208, 218.

In particular, FIG. 2 shows a situation where a user terminal 170, which may be mobile, communicates over a radio connection with the first base station 142, simultaneously measuring common pilots of this base station 142 and the second base station 144 for a possible handover. In a typical situation the radio connection of the user terminal shifts to the carrier wave of the second base station when there is free capacity in the new cell and the new connection has a better quality. Channel and cell handovers enable continuity of the radio connection when the user terminal moves or the physical radio channel changes as a function of time.

The control blocks 200, 210, 220, 226 refer to a block which controls the operation of the device and which is nowadays usually implemented as a processor and its software, but various hardware solutions are also feasible, e.g. a circuit built from separate logic components or one or more application specific integrated circuits ASIC. A hybrid of these different implementations is also feasible. When selecting the implementation method, a person skilled in the art will consider the requirements set on the size and power consumption of the device, the necessary processing capacity, the production costs and the production volumes.

Further information on radio telecommunications systems is available in the literature and standards of the field.

Figure 3:
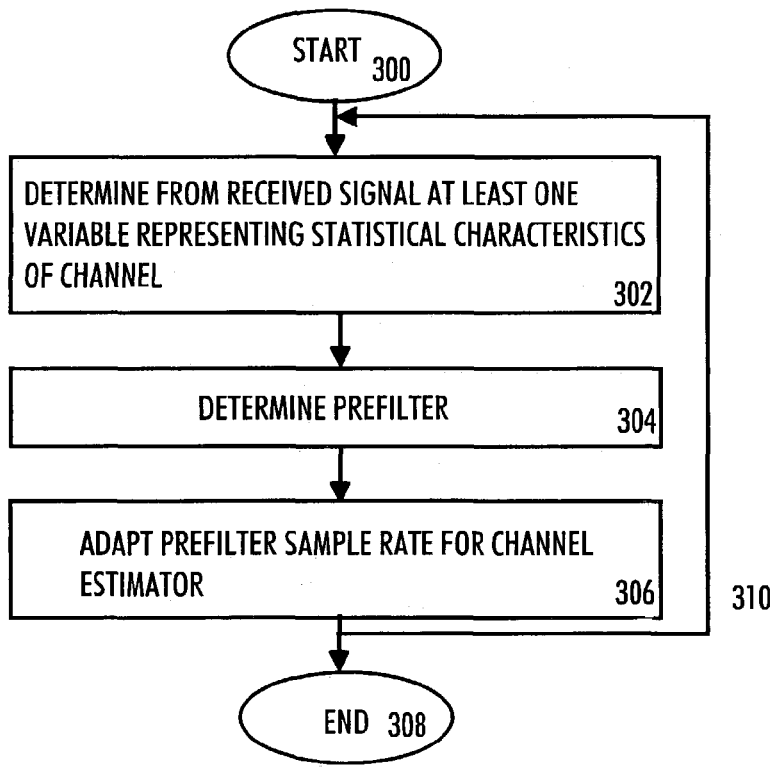
FIG. 3 is a flow chart.

Next, the method for implementing an adaptive channel estimator will be described by means of FIG. 3. The purpose of the method is to adapt the sample rate of a signal entering the channel estimator of the radio receiver such that the length of the channel estimator can be minimized and advantageously kept constant, even though the speed of the transmitter would change with respect to the receiver. The performance of the method starts in block 300.

In block 302, at least one variable representing the statistical characteristics of the channel is determined from the received signal. These variables include, for instance, Doppler spread, form of Doppler power spectrum, width of Doppler power spectrum, speed of the radio transmitter, channel coherence time, correlation between channel measurements or signal-to-noise ratio. The variables are typically determined from the received signal using measurement results. The Doppler spread depends on the transmitter speed in relation to the receiver speed, and consequently in a typical cellular radio system it changes as a function of time. For determining the Doppler spread, the form of the Doppler power spectrum, the width of the Doppler power spectrum, the speed of the radio transmitter, the channel coherence time, the correlation between channel measurements or the signal-to-noise ratio it is possible to use any prior art method.

In block 304, a prefilter is determined by means of at least one variable representing the statistical characteristics of the channel. Prefilter taps are selected such that the largest possible amount of the information provided by the available channel measurements can be utilized in the channel estimate filter, and at the same time, the length of the channel estimate filter will not become excessively long. This is achieved such that the prefilter compresses the channel measurement information to a lower sample rate while minimizing the loss caused. The prefilter employed can be a simple averaging filter, the length of which is altered. It should be noted, however, that a long filter requires a long channel coherence time, and in quickly changing conditions, the reliability of the information suffers from a long filter. Hence, the length of the filter is always a compromise: the filter is selected to be shorter, whereby some of the available channel information will be lost in order for the channel not to have altered excessively, i.e. the reliability of the samples has not decreased excessively, between the measurement results used in the prefiltering.

In block 306, the sample rate of the prefilter output is adapted for the channel estimator. At the output of the prefilter there is thus provided a signal having a known Doppler spread and coherence time, to which the length of the channel estimator is adapted. The sample rate depends advantageously on the sample rate of the prefilter input signal and on the Doppler spread, the form of the Doppler power spectrum, the width of the Doppler power spectrum, the speed of the radio transmitter, the channel coherence time, the correlation between the channel measurements and/or the signal-to-noise ratio determined from the received signal. The Doppler spread can be measured either at the prefilter output or input. If the Doppler spread is measured at the prefilter input, the characteristics of the prefilter and the output sample rate are determined on the basis of the measured Doppler spread. The Doppler spread measured at the prefilter output can be used for controlling the characteristics of the pre-filtering by means of feedback such that the output Doppler spread or the correlation between the channel measurements is kept as constant as possible. The signal-to-noise ratio affects the sample rate selection such that if the signal-to-noise ratio is poor, the samples are averaged for reducing the effect of noise, and if the signal-to-noise ratio is good, the samples can be considered sufficiently reliable, and averaging is needed less or not at all.

The sample rate can be altered higher or lower. The sample rate can be altered, for instance, by converting a digital signal into an analogue one and by sampling the signal at a new sample rate in a new A/D conversion. The sample rate can also be changed digitally: increasing can be implemented e.g. by a prior art interpolation method and decreasing, correspondingly, by a prior art decimation method. In practice, the digital conversion is more common, because the extra D/A and A/D conversions cause distortions in the signal, due to quantizing, for instance.

The alteration of sample rate is typically implemented digitally by means of a linear filter. The filter can be a moving average filter, a weighted averaging filter or the like.

Next, decimation and interpolation will be described briefly. The decimation and the interpolation are described in greater detail in the literature of the field.

Let us assume that the sample rate is decreased with an integer factor M. Thus the output sequence of the decimator comprises only every $M^{th}$ sample, i.e.

$$F' = \frac{F}{M}, \quad (1)$$

where
  F'=a new sample rate
  F=the original sample rate, i.e. symbol rate of a pilot signal, for instance, and
  M 32 an integer factor.

Because the original sample rate is adapted to the bandwidth of the received signal, a decrease in the sample rate causes aliasing. In order to prevent aliasing, the bandwidth must be restricted. The bandwidth can be restricted prior to decreasing the sample rate, or thereafter, with a low-pass filter. In this case the prefilter advantageously comprises both an anti-aliasing filter and an actual decimator filter.

The bandwidth of the decimator filter changes in relation to the integer factor M. If the original bandwidth is π, the bandwidth after the low-pass filter is π/M, which is thus the bandwidth of the decimator filter.

Let us assume that the sample rate is increased with an integer factor L. Thus L−1 new zero samples are added to the interpolator output sequence in suitable positions between the existing samples, i.e.

$$F'=LF, \quad (2)$$

where
  F'=a new sample rate
  F=the original sample rate, i.e. symbol rate of a pilot signal, for instance, and
  L=an integer factor.

Sample values are obtained by means of the existing samples by calculating with a prior art method. The samples are given values that produce a desired impulse response.

The bandwidth of the prefilter changes in relation to the integer factor L. If the original bandwidth is π, the bandwidth of the prefilter is π/L.

The sample rate can also be changed by means of a rational factor L/M. In that case, first is performed interpolation by means of the factor L and thereafter decimation by means of the factor M. The interpolation is performed prior to the decimation, so that the signal spectrum would not change, i.e.

$$F' = \frac{L}{M}F, \quad (3)$$

where
  F'=a new sample rate
  F=the original sample rate, i.e. symbol rate of a pilot signal, for instance
  M=an integer factor
  L=an integer factor.

In this case the prefilter advantageously comprises an interpolation filter, a low-pass filter and a decimation filter in cascade.

The method ends in block 308. The arrow 310 denotes the repeatability of the method, for instance, at given intervals. The method can also be repeated in other manners. In practice, the method can be applied, for instance, such that when the speed of the radio transmitter changes slowly, the adjustment is not performed, or such that the sample rate is changed in different ways for different signals.

Figure 4:
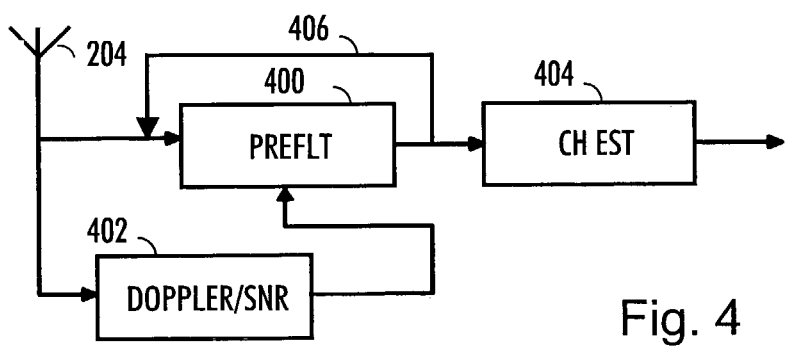
FIG. 4 shows an example of a prefiltering arrangement.

FIG. 4 shows an example of a digital prefiltering arrangement for implementing an adaptive channel estimator. A received, sampled signal is applied to a prefilter 400, which comprises an interpolator or a decimator. The filters can be implemented as FIR (Finite Impulse Response) filters, IIR (Infinite Impulse Response) filters or as a combination thereof.

The FIR filters have the following characteristics: they are stable, their quantizing characteristics are good and linear phase characteristics are readily achievable. The IIR filters, in turn, are suitable for applications, in which a clear-cut difference between a stop band and a pass band or a long impulse response is required. The selection of the filter type thus depends on the application, i.e. on the characteristics required of the filter. Filter design methods are commonly known in the field, and therefore they are not described in greater detail herein.

In the case of the decimator, the prefilter also advantageously comprises an anti-aliasing filter, which can be implemented as a filter separate from the prefilter or as a filter degree connected thereto.

Let us assume that in the decimation the sampling frequency is reduced with an integer factor M. Thus, the decimator output sequence comprises only every $M^{th}$ sample. Because the original sampling frequency is adapted to the bandwidth of the received signal, reducing the sampling frequency causes aliasing. To prevent aliasing it is necessary to restrict the bandwidth. The bandwidth can be restricted prior to reducing the sampling frequency or thereafter with a low-pass filter. In this case the prefilter advantageously comprises both an anti-aliasing filter and an actual decimator filter.

The bandwidth of the decimator filter changes in relation to the integer factor M. If the original bandwidth is $\pi$, the bandwidth after the low-pass filter is $\pi/M$, which is thus the bandwidth of the decimator filter.

Let us assume that in interpolation the sample rate is increased with an integer factor L. The bandwidth of the prefilter changes in relation to the integer factor L. If the original bandwidth is $\pi$, the bandwidth of the prefilter is $\pi/L$.

L−1 new zero samples are added to the interpolator output sequence in suitable positions between the existing samples. Sample values are obtained by means of the existing samples by calculating with a prior art method. The samples are given values that produce a desired impulse response.

The sample rate can also be changed by means of a rational factor L/M. In that case, first is performed interpolation by means of the factor L and thereafter decimation by means of the factor M. The interpolation is performed prior to the decimation, so that the signal spectrum would not change. In this case the prefilter advantageously comprises an interpolation filter, a low-pass filter and a decimation filter in cascade.

The integer factor L of the interpolator and the integer factor M of the decimator, which describe the change in the sample rate, are obtained by means of a determination block 402. In the determination block at least one variable representing the statistical characteristics of the channel is determined from received signal, such as Doppler spread, form of Doppler power spectrum, width of Doppler power spectrum, speed of the radio transmitter, channel coherence time, correlation between channel measurements and/or signal-to-noise ratio. The Doppler spread can be measured either at the prefilter output or input. If the Doppler spread is measured at the prefilter input, the prefilter characteristics and the output sample rate are determined on the basis of the measured Doppler spread. The Doppler spread measured at the prefilter output or the correlation between the channel measurements can be used for adjusting the characteristics of the prefiltering by means of feedback 406 such that the output Doppler spread or the correlation between the channel measurements is kept as constant as possible. The signal-to-noise ratio affects the selection of the sample rate such that if the signal-to-noise ratio is poor, samples are averaged so as to reduce the effect of the noise, and if the signal-to-noise ratio is good, samples can be considered sufficiently reliable, whereby averaging is needed lessor not at all.

From the prefilter the signal is applied to a channel estimator 404. In radio receivers channel estimators are used for measuring the state of the radio channel. Typically, state information is required for implementing coherent detection, in addition to which it can be utilized in measuring signal-to-noise ratio (SNR), signal-to-interference ratio and in implementing various channel equalizers for removing phase distortion or inter-symbol interference ISI. The channel estimator is typically implemented by means of filter structures.

Figure 5:
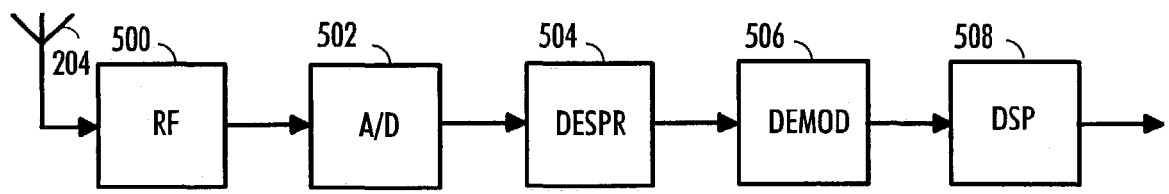
FIG. 5 shows an example of a base station receiver.

In the following the invention is described with reference to FIG. 5, which shows a block diagram of a simplified example of a base station receiver in a broadband telecommunication system in accordance with an embodiment. It is apparent to a person skilled in the art that the receiver may also include other parts than those described above in association with FIG. 5. The receiver, to which the invention can be applied, may also be a receiver of a narrow-band system.

The receiver comprises an antenna 204. The antenna can be a single antenna or an antenna array. The receiver also comprises RF parts 500, in which the received signal is filtered, down-mixed either through an intermediate frequency or directly to the baseband, and amplified. In block 502 the signal is converted from analogue to digital by sampling and quantizing, in block the direct spread broadband signal is despread using multiplication by a code-generator-generated code sequence, in block 506 the carrier wave effect is removed from the signal by demodulation and in block 508 the necessary signal processing is performed, such as deinterleaving, decoding, and decrypting. Also prefiltering and determination of variables representing the statistical characteristics of the channel, such as the Doppler spread, the form of the Doppler power spectrum, the width of the Doppler power spectrum, the speed of the radio transmitter, the channel coherence time, the correlation between the channel measurements and/or the signal-to-noise ratio and the operations of the channel estimator can be performed in the signal processing block. In practice, the signal processing block is typically implemented by means of a processor or a computer program to be executed therein. There may be one or more signal processing blocks.

In one preferred embodiment the receiver, such as a RAKE-type multi-branch receiver, comprises a delay estimator, by which delays of multi-path propagated components are estimated. The delays of different RAKE-branches are set to correspond to the delays of signal components delayed in different ways.

Advantageously, the invention is implemented by software, whereby the functions of the described method are implemented as base station software. The invention can also be implemented by hardware solutions providing the required functionality, for instance, as an ASIC (Application Specific Integrated Circuit), or by utilizing separate logic components.

Even though the invention is described in the above with reference to the example of the attached drawings, it is apparent that the invention is not restricted thereto, but it can be modified in a variety of ways within the scope of the inventive idea disclosed in the accompanying claims.

The invention claimed is:

1. A method, comprising:
    determining from a received signal at least one variable representing statistical characteristics of the channel;
    determining a prefilter using the at least one variable representing the statistical characteristics of the channel; and
    adapting sample rate of the prefilter output for a channel estimator used when receiving signals, wherein the sample rate is adapted in relation to the prefilter input signal and the at least one variable representing the statistical characteristics of channel determined from the received signal.

2. The method of claim 1, wherein the statistical variable is Doppler spread, the form of Doppler power spectrum, the width of Doppler power spectrum, the speed of a radio transmitter, channel coherence time, correlation between channel measurements or signal-to-noise ratio.

3. The method of claim 1, wherein the sample rate is adapted by decimation.

4. The method of claim 1, wherein the sample rate is adapted by interpolation.

5. The method of claim 1, wherein the length of the channel estimator is constant.

6. The method of claim 1, wherein the Doppler spread is measured at the prefilter input.

7. The method of claim 1, wherein the Doppler spread is measured at the prefilter output.

8. The method of claim 1, wherein the Doppler spread or the correlation between the channel measurements are kept at least substantially constant using feedback at the prefilter output.

9. The method of claim 1, wherein the bandwidth of the decimator and interpolator filters changes in relation to a change in the sample rate.

10. A prefiltering apparatus, comprising:
a variable determiner configured to determine from a received signal at least one variable representing statistical characteristics of the channel,
a determiner configured to determine the number of prefilter taps using the at least one variable representing the statistical characteristics of the channel,
an adaptor configured to adapt sample rate of the prefilter output for a channel estimator used when receiving signals, wherein the sample rate is adapted in relation to the prefilter input signal and the at least one variable representing the statistical characteristics of channel determined from the received signal.

11. The apparatus of claim 10, wherein the statistical variable is Doppler spread, form of Doppler power spectrum, width of Doppler power spectrum, speed of a radio transmitter, channel coherence time, correlation between channel measurements or signal-to-noise ratio.

12. The apparatus of claim 10, further comprising
decimation adaptor configured to adapt the sample rate by decimation.

13. The apparatus of claim 10, further comprising:
an interpolation adaptor configured to adapt the sample rate by interpolation.

14. The apparatus of claim 10, further comprising:
a variable adaptor configured to adapt the sample rate in relation to the prefilter input signal and the at least one variable representing the statistical characteristics of the channel determined from the received signal.

15. The apparatus of claim 10, wherein the length of the channel estimator is constant.

16. The apparatus of claim 10, further comprising:
a measurer configured to measure Doppler spread at the prefilter input.

17. The apparatus of claim 10, further comprising:
a measurer configured to measure Doppler spread at the prefilter output.

18. The apparatus of claim 10, wherein the Doppler spread or the correlation between the channel measurements is kept at least substantially constant using feedback at the prefilter output.

19. The apparatus of claim 10, wherein the bandwidth of the decimator and interpolator filters changes in relation to a change in the sample rate.

20. An apparatus, comprising:
a variable determiner configured to determine from a received signal at least one variable representing statistical characteristics of the channel,
a determiner configured to determine the number of prefilter taps using the at least one variable representing the statistical characteristics of the channel,
an adapter configured to adapt sample rate of the prefilter output for a channel estimator used when receiving signals, wherein the sample rate is adapted in relation to the prefilter input signal and the at least one variable representing the statistical characteristics of channel determined from the received signal.

21. The apparatus of claim 20, wherein the statistical variable is Doppler spread, form of Doppler power spectrum, width of Doppler power spectrum, speed of a radio transmitter, channel coherence time, correlation between channel measurements or signal-to-noise ratio.

22. The apparatus of claim 20, further comprising:
a decimation adapter configured to adapt the sample rate by decimation.

23. The apparatus of claim 20, further comprising:
an interpolation adapter configured to adapt the sample rate by interpolation.

24. The apparatus of claim 20, further comprising:
a variable adapter configured to adapt the sample rate in relation to the prefilter input signal and the variable representing the statistical characteristics of the channel determined from the received signal.

25. The apparatus of claim 20, wherein the length of the channel estimator is constant.

26. The apparatus of claim 20, further comprising:
a measurer configured to measure the Doppler spread at the prefilter input.

27. The apparatus of claim 20, further comprising:
a measurer configured to measure the Doppler spread at the prefilter output.

28. The apparatus of claim 20, wherein the Doppler spread or the correlation between the channel measurements is kept at least substantially constant at the prefilter output.

29. The apparatus of claim 20, wherein changes in the sample rate correspond to changes in a bandwidth of a decimator filter and an interpolator filter which are used to perform sample rate adaptation.

30. A prefiltering apparatus, comprising:
variable determining means for determining from a received signal at least one variable representing statistical characteristics of a channel;
determining means for determining the number of prefilter taps using the at least one variable representing the statistical characteristics of the channel; and
adapting means for adapting sample rate of a prefilter output for a channel estimator used when receiving signals, wherein the sample rate is adapted in relation to the prefilter input signal and the at least one variable representing the statistical characteristics of channel determined from the received signal.

31. An apparatus, comprising:
variable determining means for determining from a received signal at least one variable representing statistical characteristics of the channel;
determining means for determining the number of prefilter taps using the at least one variable representing the statistical characteristics of the; and adapting means for adapting sample rate of the prefilter output for a channel estimator used when receiving signals, wherein the sample rate is adapted in relation to the prefilter input signal and the at least one variable representing the statistical characteristics of channel determined from the received signal.

32. A computer readable medium comprising a computer program, said computer program configured to control a processor to perform:

determining from a received signal at least one variable representing statistical characteristics of the channel;

determining a prefilter using the at least one variable representing the statistical characteristics of the channel; and adapting sample rate of the prefilter output for a channel estimator used when receiving signals, wherein the sample rate is adapted in relation to the prefilter input signal and the at least one variable representing the statistical characteristics of channel determined from the received signal.

* * * * *